April 2, 1940.  G. E. MILLS  2,195,420
TERRESTRIAL GLOBE
Filed Aug. 3, 1937  3 Sheets-Sheet 3
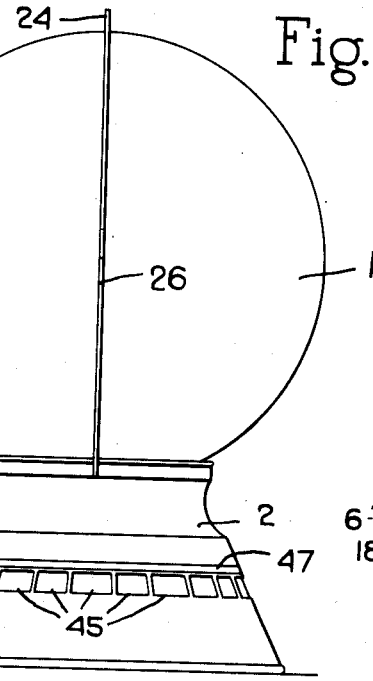
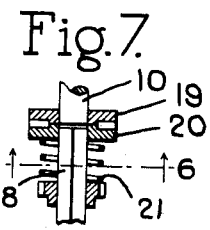
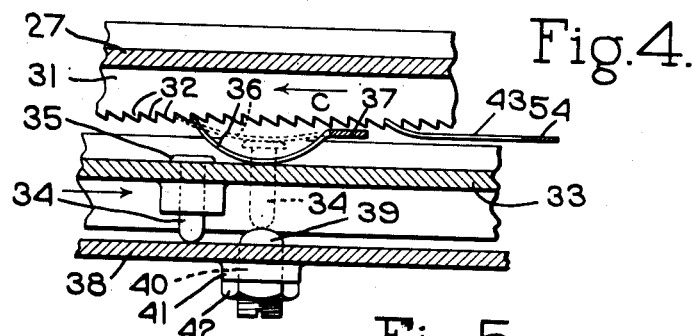
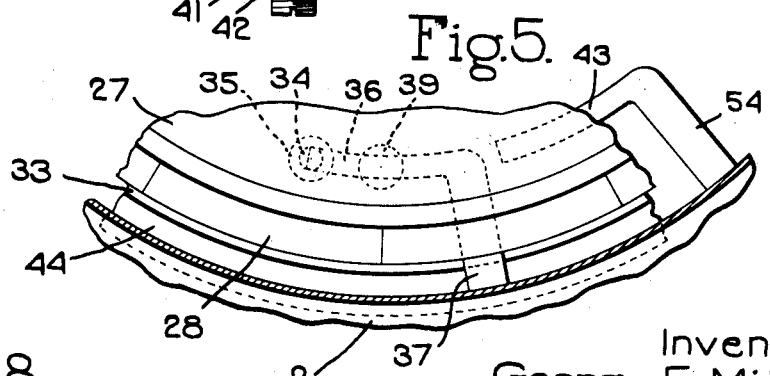
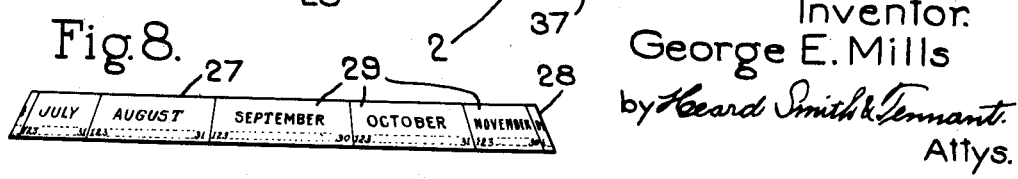
Inventor:
George E. Mills
by Heard Smith & Tennant
Attys.

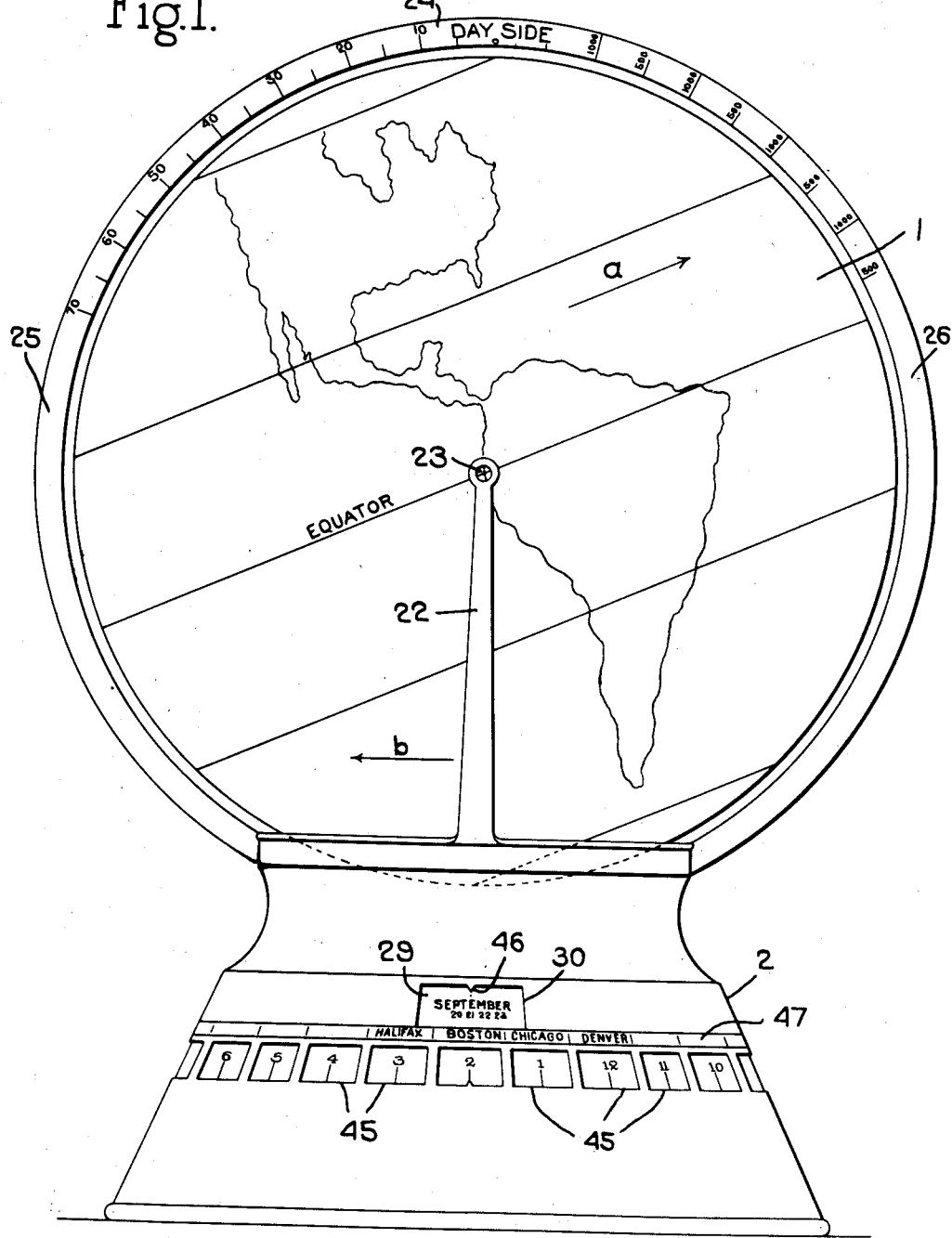

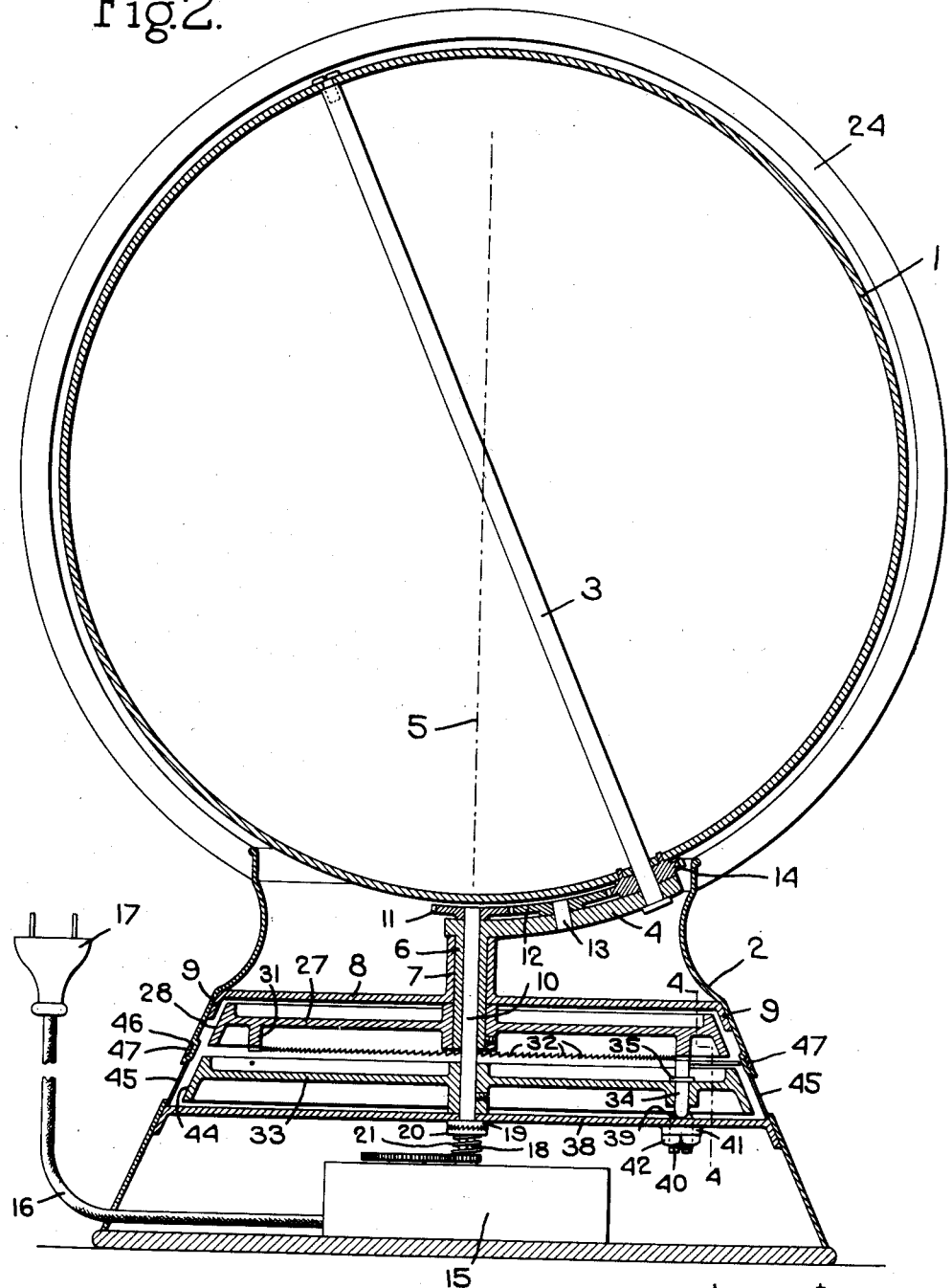

Patented Apr. 2, 1940

2,195,420

UNITED STATES PATENT OFFICE 2,195,420

TERRESTRIAL GLOBE

George E. Mills, Brighton, Mass., assignor of one-half to William J. Brooks, Roslindale, Mass.

Application August 3, 1937, Serial No. 157,144

7 Claims. (Cl. 58—44)

This invention relates to terrestrial globes and it has for one of its objects to provide novel means for operating the globe by which it will be turned about its own axis once each twenty-four hours to simulate the day and night effect, and will also be given one bodily rotation each year about an axis making an angle of approximately 23½ degrees with the axis of the globe, thereby to simulate the changing seasons of the year.

Another object of the invention is to provide a novel mounting for the globe which is so constructed that the globe can be manually operated to set it for any day of the year and any hour of the day without interfering with the automatic operation of the globe.

Other objects of the invention are to improve generally terrestrial globes in the particulars more fully hereinafter set forth.

In the drawings wherein I have illustrated a selected embodiment of my invention:

Fig. 1 is a side view of a terrestrial globe and appurtenances thereto embodying my invention;

Fig. 2 is a vertical sectional view through the globe and the base;

Fig. 3 is a side elevation of the globe looking at right angles to Fig. 1;

Fig. 4 is an enlarged fragmentary sectional view on the line 4—4, Fig. 2, showing the means for rotating the globe about the vertical axis;

Fig. 5 is a plan view of Fig. 4;

Fig. 6 is a section on the line 6—6, Fig. 7;

Fig. 7 is a fragmentary, vertical, sectional view through the lower end of the shaft 10 and the upper end of the spindle 18;

Fig. 8 is a side view of the date dial.

In the drawings 1 indicates a terrestrial globe which has imprinted on its surface a map of the world. This globe is mounted on a hollow base indicated generally at 2 with its axis standing at an angle of approximately 23½ degrees from the vertical, thereby simulating the inclination of the axis of the earth with reference to the plane of its orbit.

The globe 1 is mounted on the base 2 so that it can rotate about its own axis and so that it can be turned bodily about a vertical axis which intersets the axis of the globe at the center thereof.

Means are also provided for rotating the globe about its own axis once each twenty-four hours to simulate the day and night phases of the earth, and to rotate the globe about the vertical axis once every 365 days to simulate the orbital movement of the earth about the sun.

The polar axis of the globe about which it rotates to produce the day and night effect is indicated at 3 and is in the form of a rod that is mounted on an arm 4 that is adapted to rotate about a vertical axis indicated by the line 5, the polar axis 3 of the globe making an angle of approximately 23½ degrees with the vertical axis 5.

The arm 4 is shown as having a hollow stem or hub portion 6 which extends through and is rotatably mounted in a bearing member 7 carried by the base 2, the axis of rotation of the sleeve 6 being the vertical axis 5.

The bearing member 7 is shown as carried by a plate 8 extending transversely across the hollow base 2 and secured to the walls thereof as indicated at 9.

Extending axially through the sleeve 6 is a shaft 10 through which the globe is rotated about its polar axis 3. This shaft 10 has fast thereto a gear 11 which meshes with an intermediate gear 12 rotatable about a stud 13 carried by the arm 4, and the gear 12 in turn meshes with a gear 14 that is rotatable about the polar axis 3 of the globe and is rigid with said globe.

Means are provided for rotating the gear 14 and the globe 1 about its polar axis once every twenty-four hours to simulate the day and night effect, and also to give the arm 4 and sleeve 6 one complete rotation every 365 days to simulate the movement of the earth in its orbit about the sun.

While any suitable means for thus rotating the globe and the arm 4 may be provided, I will preferably employ a suitable clock mechanism indicated generally at 15 which is situated within the hollow base 2. The clock illustrated is an electric clock and 16 indicates the cable containing the circuit wires leading to the clock and having at its end a terminal 17 adapted to be plugged into any outlet. The clock 15 may be of any desirable construction and it is equipped with a spindle 18 which rotates once every twenty-four hours.

The spindle 18 is coupled to the shaft 10 with a suitable one-way driving connection by which the shaft 10 will be rotated synchronously with the spindle 18 and thus make one complete rotation every twenty-four hours, but which is constructed so that the globe can be turned about its axis by hand for instructional purposes without affecting the automatic operation of the shaft 10 through the medium of the clock 15.

As herein shown, the shaft 10 has at its lower end a toothed clutch member 19 having clutch teeth of the ratchet type, which cooperates with a second clutch member 20 carried by the spindle 18. This clutch member 20 is so connected to the spindle 18 that it rotates therewith but it can slide on the spindle in an axial direction. This result is obtained by making the spindle square or non-circular in cross section and mounting the clutch member 20 thereon so that it can move axially of the spindle. A spring 21 encircling the spindle and engaging the clutch member 20 serves to hold said clutch member yieldingly in engagement with the clutch member 19.

Rising from the base 2 is an arm 22 which is curved to follow the curvature of the globe, and at its upper end this arm has an opening 23 which may be called a "sun spot" as it indicates the apparent position of the sun in all positions of the globe, it being assumed that the sun is on a line extending from the center of the globe through the opening 23.

The globe is also equipped with a sunrise bar and a sunset bar. These bars together form a ring 24 which encircles the globe and is secured to the base 2 in some suitable way. The portion 25 of the bar 24 constitutes the "sunrise bar" and the portion 26 constitutes the "sunset bar." These bars divide the globe into the day portion and the night portion, the day portion being that portion of the globe on the side of the bars adjacent the sun spot 23 and the night portion being that on the opposite side. For convenience, I propose to apply the notation "day side" to one side of the bar 24 and the notation "night side" to the opposite side.

I have referred above to the means for automatically rotating the globe about its axis 3 once every twenty-four hours. The device also includes means for rotating the sleeve 6 and arm 4 about the vertical axis 5 once every 365 days.

The sleeve 6 has fast thereon a dial member 27 which is provided with a peripheral face 28 divided into twelve sections 29, one for each month of the year, each section having the name of a month imprinted thereon. The hollow base 2 is provided with a window 30 of a size corresponding to one of the sections 29 and through which the name of the month may be read as the dial 27 rotates.

The dial 27, which for convenience may be called a "date dial", is provided with a depending circular flange 31 having ratchet teeth 32 on its lower edge, there being 365 such ratchet teeth on the complete circle of the flange.

Means are provided for stepping the flange 31 and dial 27 forward one tooth in the direction of arrow c in Fig. 4 at each rotation of the shaft 10, and as there are 365 ratchet teeth 32, it follows that the dial 27, sleeve 6 and arm 4 will make one complete revolution to 365 revolutions of the shaft 10.

The shaft 10 has fast thereon a second dial 33, which will be referred to as a "time dial", and this dial carries a pin 34 which is capable of vertical movement in the dial, said pin having a collar 35 which by its engagement with the upper face of the dial limits the downward movement of the pin.

Secured to the wall of the base 2 is a pawl member 36 in the form of an arcuate spring. The end of the pawl member 36 engages the ratchet teeth 32 and said pawl member is carried by an arm 37 which is secured to and extends inwardly from the wall of the base 2. The base 2 is provided with a transversely extending plate 38 situated beneath the dial 33, and said plate carries on its upper face a cam member 39 which is situated directly beneath the pawl 36 and is in the path of movement of the lower end of the pin 34.

At each rotation of the dial 33 the pin 34 rides over the cam 39 and is thereby raised into the dotted line position, Fig. 4. At the time that the pin is thus elevated, it is directly beneath the spring pawl 36 and, as the pin rises, it engages the pawl 36 and flattens the latter, as shown by dotted lines, Fig. 4, thereby advancing the dial 27 one tooth. As the pin 34 passes off from the cam 39, said pin will drop back into its normal position, and as the pawl 36 resumes its bow shape, the end thereof will click over one tooth 32.

This cam 39 may be provided for in various ways. I have herein illustrated it as the rounded end of a pin 40 which may be screwed into a boss 41 formed on the under side of the plate 38. 42 indicates a lock nut by which the pin may be locked in its adjusted position.

43 indicates a spring pawl which is carried on the end of an arm 54 that extends inwardly from and is rigidly secured to the wall of the base 2. This pawl 43 prevents the dial 27 from being moved backwardly by the frictional engagement of the end of the spring pawl 36 with the teeth 32 when said pawl is resuming its bowed shape from its straightened shape.

The time dial 33 is provided with a peripheral surface 44 on which are imprinted numerals representing the twenty-four hours of the day, and the base 2 is provided with twenty-four windows or sight openings 45 through which the notation on the peripheral surface 44 of the dial 33 may be read.

The sections 29 on the peripheral surface 28 of the date dial 27 may have imprinted thereon not only the names of the months but also the days of the month. The window 30 is provided with an indicating point 46 to assist in reading correctly the notation on each section 29 as the date dial 27 rotates. The dial 27 with the reading matter thereon thus constitutes a calendar which changes automatically from day to day and from month to month.

The time dial 33 and the notations thereon constitute a clock by which the time of day can be observed.

By means of the mechanism above described, the globe will always show the correct position of the earth relative to the sun throughout the year. For educational purposes it is desirable to be able to change manually the position of the globe not only on its own axis but relative to the vertical axis 5 in order to demonstrate to students the relative position of the sun and the earth at various times of the year, and the mechanism for operating the globe is so constructed as to permit this to be done. The one-way driving connection 19, 20 permits the globe to be turned forwardly manually about its axis 3 in the direction of the arrow a in Fig. 1, and by doing this, the relative day and night conditions for any place on the earth can be readily demonstrated to pupils.

The relative position of the earth and sun for the changing seasons can be demonstrated by turning the globe and the arm 4 about the vertical axis 5 in the direction of the arrow b in Fig. 1, the spring pawl 36 and stop pawl 43 permitting such movement.

I have, therefore, provided a terrestrial globe which is automatic in its operation but which can nevertheless be manually adjusted into different positions without any detrimental effect on the automatic mechanism.

The base 2 is shown as having a peripheral groove 46 in which is received a band 47 bearing the names of twenty-four cities throughout the world, one in each of the twenty-four time zones. This band can be adjusted in the groove so as to bring the name of any city thereon opposite the window 30. When the globe is used, it is expected that the band 47 will be so adjusted as to place opposite the window 30 the name of the city in the time zone in which the globe is being used. If, for instance, the globe is being used in the eastern zone, then the band would be adjusted so as to bring the notation "Boston" in alignment with the window 30, as shown in Fig. 1. When so adjusted, the notation on the time dial 33 will give the time in any one of the other twenty-four time zones corresponding to the time indicated in the "Boston" time zone. As shown in Fig. 1, the time dial indicates that it is two o'clock in Boston, and the notation which is visible through the other window openings 45 shows that when it is two o'clock in Boston, or in the eastern time zone, it will be one o'clock in Chicago, or in the central time zone, and twelve o'clock in Denver, or in the mountain time zone, and eleven o'clock in the Pacific time zone. The names of the cities on the opposite side of the band 47 from that shown in Fig. 1 will, of course, be names of cities on the opposite side of the earth from the United States. The reading on the time dial 33 and the band 47 on the opposite side of the globe from that shown in Fig. 1 will give the time at various points on the opposite side of the earth when it is two o'clock in Boston.

Inasmuch as the time dial is connected to and rotates with the globe 1, the notation on the time dial will always indicate the correct time at any one of the cities indicated on the band 47.

It will be understood that if the globe is being used in a city in some other time zone than the eastern zone, the band 47 will be adjusted to bring into the indicating position the name of the city thereon located in said time zone.

If desired, the sections 29 on the date dial 27 may be imprinted to show the phases of the moon or the tide conditions or said sections may have imprinted thereon any other astronomical data which is coordinated with the movement of the earth around the sun.

For convenience in using the globe, one-half of the bar 24 may be graduated in degrees and the other half in miles. In Fig. 1, the "sunrise" side 25 of the bar is shown as graduated in degrees and the "sunset" side 26 is shown as graduated in miles.

In my co-pending application, Serial No. 187,199, filed January 27, 1938, I have included generic claims broad enough to cover both the construction therein shown and that herein illustrated, the claims of this application being directed to the species herein shown.

I claim:

1. A terrestrial globe comprising a base, a globe-supporting member mounted in said base for rotation about a vertical axis, a globe rotatably carried by said member for rotation thereon about an axis inclined to said vertical axis, globe-rotating means including a shaft coaxial with the vertical axis of the globe-supporting member, means to give the globe-supporting member a forward rotative step about its vertical axis at each rotation of said shaft, said means including an element carried by and rotating with the shaft, and a second element cooperating with the first-named element to actuate the latter at a predetermined point in each rotation of the shaft.

2. A terrestrial globe comprising a base, a globe-supporting member mounted therein for rotation about a vertical axis, a globe carried by said globe-supporting member and mounted thereon for rotation about an axis at an inclination to the vertical axis, globe-rotating mechanism to rotate the globe about its inclined axis once every twenty-four hours, said globe-rotating mechanism including a shaft coaxial with the vertical axis of the globe-supporting member and rotating in synchronism with the rotation of the globe about its axis, a time dial carried by said shaft, a ratchet member rigid with the globe-supporting member, a pawl cooperating with the ratchet member, a pawl actuating pin carried by the time dial and means cooperating therewith to actuate said pin at each rotation of the time dial thereby to actuate the pawl and step the globe-supporting member forward.

3. A terrestrial globe comprising a base, a globe-supporting member mounted therein for rotation about a vertical axis, a globe carried by said globe-supporting member and mounted thereon for rotation about an axis at an inclination to the vertical axis, globe-rotating mechanism to rotate the globe about its inclined axis once every twenty-four hours, a time dial associated with said globe-rotating mechanism and rotatable about said vertical axis in synchronism with the rotation of the globe about its axis, and means to step the globe-supporting member forward at each rotation of the time dial, said means including an element carried by the time dial and another element for actuating the first-named element at a predetermined point in the rotation of the time dial.

4. A terrestrial globe comprising a base, a globe-supporting member mounted therein for rotation about a vertical axis, a globe carried by said globe-supporting member and mounted thereon for rotation about an axis at an inclination to the vertical axis, globe-rotating mechanism to rotate the globe about its inclined axis once every twenty-four hours, a time dial associated with said globe-rotating mechanism and rotatable about said vertical axis in synchronism with the globe, a date dial carried by and rotating with the globe-supporting member, said date dial being situated within the base, and means cooperating with the date dial to step the latter forward one step at each rotation of the time dial, said means including an element carried by the time dial and a second element cooperating therewith at a predetermined point only in the rotation of the time dial.

5. A terrestrial globe comprising a hollow base, a globe-supporting member mounted therein for rotation about a vertical axis, a globe rotatably carried by said member for rotation about an axis inclined to the vertical axis, a time dial situated within the base and connected to the globe to rotate about said vertical axis synchronously with the rotation of the globe about its axis, a date dial also situated with the base and carried by the globe-supporting member, said date dial being rotatable about said vertical axis, and means including an element carried by the time dial for stepping the date dial and globe-supporting member forward one step at each complete rotation of the time dial.

6. A terrestrial globe comprising a hollow base, a globe-supporting member mounted in the base for rotation about a vertical axis, a globe rotatably carried by said member for rotation thereon about a polar axis inclined to said vertical axis, a time dial mounted for rotation about said vertical axis and connected to the globe to rotate synchronously therewith, a date dial carried by the globe supporting member and situated coaxially of said time dial, said date dial having ratchet teeth, a spring pawl cooperating with said teeth, and means including an element carried by the time dial to give the pawl an operative movement at each rotation of the time dial thereby to step the date dial and globe-supporting member forward one step.

7. A terrestrial globe comprising a hollow base, a globe-supporting member mounted therein for rotation about a vertical axis, a globe carried by the globe-supporting member and mounted thereon for rotation about an axis inclined to the vertical axis, time mechanism located within the base, globe-rotating means including a shaft coaxial with said vertical axis of the globe-supporting member, a one-way driving connection between the time mechanism and said shaft which permits manual operation of the globe, and means rendered operative at each rotation of the shaft and by the rotary movement thereof to step the globe-supporting member forward one step.

GEORGE E. MILLS.

CERTIFICATE OF CORRECTION.

Patent No. 2,195,420.  April 2, 1940.

GEORGE E. MILLS.

It is hereby certified that error appears in the printed specification of the above numbered patent requiring correction as follows: Page 3, second column, line 67, claim 5, for the word "with" read --within--; and that the said Letters Patent should be read with this correction therein that the same may conform to the record of the case in the Patent Office.

Signed and sealed this 14th day of May, A. D. 1940.

(Seal)

Henry Van Arsdale,
Acting Commissioner of Patents.